3,625,721
PERMEABLE REFRACTORIES
Gordon E. D. Snyder, Baltimore, and Wate T. Bakker, Severna Park, Md., assignors to General Refractories Company, Philadelphia, Pa.
No Drawing. Filed Jan. 5, 1970, Ser. No. 829
Int. Cl. C04b 35/10
U.S. Cl. 106—65  24 Claims

ABSTRACT OF THE DISCLOSURE

Permeable refractories are prepared from a refractory brick batch mix consisting essentially of about 85 to 95 percent alumina, about 3.99 to 13.99 percent silica, about 0.01 to 0.5 percent of at least one lithium compound capable of oxidizing to lithium oxide and about 1 to 5 percent bentonite. About 65 to 85 percent by weight of the particles in the mix should be in the range of about 8 to 200 mesh and at least 10 percent of the particles should be 325 mesh or smaller. A major portion of the particles in the 8 to 200 mesh range should be of a size such that the ratio of the diameter of the largest particles of the major portion to the diameter of the smallest particles thereof is in the range of 3:1 to 1:1. These refractories have a permeability of at least 500 centidarcys at 25 p.s.i. back pressure.

---

This invention relates to permeable refractories. More specifically, this invention relates to permeable refractories high in alumina content, namely, those containing in the range of about 85 to 95 percent by weight of $Al_2O_3$. The terms "permeable" and "permeability" as employed herein refer to the capacity or ability of a refractory shape to allow the passage of a gas therethrough. For the purposes of this specification, the degree of permeability will be expressed in centidarcys at a stated back pressure. Thus, a brick will be considered permeable in accordance with this invention when such has a permeability of at least 500 centidarcys and preferably 1000 to 2000 centidarcys at 25 p.s.i. back pressure.

Generally it has been found that bricks which are less permeable tend to be stronger and possess greater refractoriness than those evidencing greater permeability. However, there are numerous applications for refractories and particularly alumina refractories wherein a high degree of pemeability is not only desired but necessitated. This invention provides alumina refractories which exhibit both strength and a high degree of permeability.

Of course, permeable refractories per se are taught in the prior art. For example, one common means of increasing permeability in refractory bricks is to lower the forming pressure. While this method results in a more permeable refractory, it also brings about reduced compaction and less particle to particle contact. Thus, there will be decreased bonding between the particles during firing which, of course, tends to minimize the strength of the bricks. Such refractory bricks deteriorate rapidly and thereby necessitate early replacement. Obviously, such deterioration is not only inconvenient, but also extremely uneconomical.

Another prior art method of increasing permeability involves the addition of combustible material to the brick batch mix. During firing of the brick formed from such a mix the combustibles will burn out resulting in greater porosity and permeability. The main drawback to this method is the inability of some of the gas generated during firing to escape through the product. This gas expands and tends to bring about the creation of cracks in the refractory brick. Of course, such cracks serve only to enhance the deterioration of the bricks.

Thus, it is among the objects of this invention to provide refractories which exhibit a unique combination of permeability and strength.

Another object of this invention is to provide a brick batch mix suitable for producing refractories in accordance with the foregoing object.

A further object of this invention is to provide a simple and economical method of making refractories in accordance with the first named object.

Still other objects and advantages will become apparent upon consideration of the following specification and claims.

The present invention is predicated upon the discovery that a refractory brick batch mix high in alumina content and having a particular grain sizing along with predetermined amounts of bentonite and a lithium compound incorporated therein can be utilized to prepare permeable refractory bricks which exhibit strength at both high and low temperatures. More specificially, the present invention involves a refractory brick batch mix consisting essentially of, by weight, about 85 to 95 percent alumina; about 3.99 to 13.99 percent silica; about 0.01 to 0.5 percent of at least one lithium compound and about 1 to 5 percent bentonite. Preferably the refractory brick batch mix will consist essentially of, by weight, about 88 to 92 percent alumina; about 5.95 to 9.95 percent silica; about 0.05 to 0.2 percent lithium compound and about 2 to 3 percent bentonite. The percentages recited herein are based on the total weight of the refractory mix.

In addition to the composition of the brick batch mix at least 65 percent and preferably 70 to 85 percent by weight of the particles therein should be in the range of about 8 to 200 mesh and at least 10 percent and preferably 15 to 30 percent, by weight, of the particles should be 325 mesh or smaller. A major portion of the particles in the 8 to 200 mesh range should be of a size such that the ratio of the diameter of the largest particles of the major portion to the diameter of the smallest particles thereof is in the range of about 3:1 to 1:1 and preferably about 2.9:1 to 2:1. All references to mesh size herein including the claims are to Tyler Standard Screen Scale Sieves.

Refractories of varying $Al_2O_3$ content are prepared by blending different alumina refractory materials. The most common alumina refractory materials and their typical $Al_2O_3$ contents are as follows: fused alumina, 99.5 percent; sintered alumina, 99.5 percent; calcined alumina, 99 percent; fused bauxite, 95 percent; calcined South American bauxite, 88 percent; calcined Alabama bauxite, 74 percent; calcined diaspore, 76 percent; burley diaspore, 48 and 58 percent; and Kyanite, 56 percent. All of these materials are chemically compatible and so they can be blended to provide almost any resultant $Al_2O_3$ content.

Generally the alumina employed in this invention will be a high purity grade, i.e., it will contain at least about 99 percent $Al_2O_3$ and preferably at least about 99.5 percent $Al_2O_3$. The alumina grog may comprise alumina which is sintered, tabular, fused, calcined or the like.

The silica component like the alumina will also be a high purity material, i.e., containing at least about 99 percent $SiO_2$. Preferably the silica will be in excess of 99.5 percent $SiO_2$ and especially in the range of about 99.9 percent $SiO_2$. Ground glass sand is a particularly suitable silica material which readily meets these criteria. Regardless of which silica material is utilized, the grain sizing should be substantially less than 200 mesh. Preferably, at least about 50 percent by weight of the silica will be 325 mesh or finer. Minor amounts of silica material which are larger than 200 mesh will not deleteriously affect the characteristics of the bricks. By minor amount is meant 10 percent or less.

In addition to the alumina and silica, the refractory brick batch mix will have incorporated therein bentonite and a lithium compound. The lithium compound employed should be capable of forming, i.e., oxidizing, to a lithium oxide during the firing of the pressed brick batch mix when said lithium compound is present therein. Lithium carbonate and lithium fluoride are particularly suitable in this respect. However, lithium fluoride is especially preferred. Nevertheless, lithium carbonate is quite desirable because of its relative cheapness and ease of handling.

Regardless of the lithium compound employed, such should be relatively finely divided, i.e., substantially all of the compound incorporated in the brick batch mix should be smaller than 100 mesh and preferably smaller than 325 mesh. As previously indicated, the lithium compound should constitute about 0.01 to 0.5 percent of the mix. It has been determined that larger amounts of the lithium compound will serve only to decrease the refractoriness of the resulting bricks.

The mineral bentonite is also incorporated in the brick batch mix of the present invention. As with most naturally occurring substances the composition of bentonite will vary to some degree. A chemical analysis of a typical bentonite would be as follows:

| Component: | Percent |
|---|---|
| $Al_2O_3$ | 21.08 |
| $SiO_2$ | 63.07 |
| $TiO_2$ | 0.14 |
| $Fe_2O_3$ | 3.50 |
| CaO | 0.65 |
| MgO | 2.67 |
| Alkalis | 2.57 |
| Minor constituents | 0.58 |
| Loss on ignition | 5.6 |

This material is comparatively inexpensive and readily available. Generally, as is the case with the lithium compound, the bentonite should be relatively fine. Specifically, the major portion thereof should be smaller than 100 mesh and preferably less than 325 mesh. Depending upon the other components of the brick batch mix and related factors, varying amounts of bentonite will be necessitated in order to achieve the benefits of this invention. The amount of bentonite utilized will range from about 1 to 5 percent by weight of the mix. Preferably, the bentonite will constitute about 2 to 3 percent of the mix. It is, of course, well within the skill of one knowledgeable in the art to determine the most satisfactory level of each component within the stated ranges for any particular brick batch mix.

As stated heretofore, the refractory brick batch mix of the present invention consists essentially of alumina, silica, a lithium compound which will form lithium oxide during burning, and bentonite. However, small amounts of other materials may be incorporated in the batch mix without deleteriously affecting the properties of the resulting brick. For example, phosphoric acid may be included to enhance the cold strength. Other binders such as sodium lignosulfonate may be included to impart green strength and lubrication. When phosphoric acid is employed, it will usually be present, by weight, in the range of about 1 to 4 percent and preferably from about 2 to 3 percent (as a 75 percent aqueous solution of $H_3PO_4$). On the other hand, when a lignosulfonate binder is employed it will ordinarily be percent, by weight, in an amount of from about 1 to 2 percent as a 50 percent solution in water or from about 0.5 to 1 percent on a dry basis.

Generally in preparing bricks from the mixes described herein, the mix will first be tempered with a small amount of water. Some or all of the water may be provided by binders of the type discussed above. In general, the total water will constitute from about 2.5 to 6 percent, by weight, of the mix and preferably from about 3.5 to 5.5 percent.

In preparing the mix, the materials may be blended in accordance with conventional refractory practice. For example, a muller mixer may be employed in which case it is preferred to first add the coarse materials to the pan along with the major portion of the moisture. This is followed by the finer materials and the remainder of the moisture. Mixing is continued until proper consistency is achieved.

The tempered mix is then pressed into any desired shape. Of course, as is apparent, the terms "shapes," "bricks" and "refractories" are used somewhat interchangeably throughout this specification. The use of these terms, whether plural or singular, is in accordance with their generally accepted meaning in the refractory art and is not intended to limit in any way the design or physical configuration of the products comprising this invention.

Generally, pressing of the permeable bricks of this invention is achieved at lower pressures than those ordinarily necessitated for conventional brick production. Specifically, a forming pressure in the range of about 2000 to 5000 p.s.i. will be adequate. Preferably, the permeable refractory bricks of this invention will be pressed at a forming pressure in the range of about 2500 to 3500 p.s.i. Of course, where desired or necessitated, higher and/or lower forming pressures may be employed. The optimum forming pressure for any given brick batch mix is within the knowledge of those skilled in the art. Of course, in addition to dry pressing other conventional forming methods such as air ramming, isostatic, and impact pressing may be employed. In fact, for the more intricate shapes, these later noted methods will be preferred or even necessary.

After pressing and drying, the shaped brick is fired at a temperature which is effective to provide the ceramic bond. Ordinarily, firing is conducted at a temperature which may range from about 1200 to 1700° C. and preferably from about 1350 to 1550° C. The most effective firing temperature will, of course, depend on numerous factors such as: composition of the brick batch mix, firing equipment, characteristics desired in the resultant bricks and the like.

As indicated heretofore, the permeable refractory bricks of this invention may be utilized in any application where a refractory material is necessitated which will permit the passage of a gas therethrough. Consequently, permeable refractory bricks are used in the argon degassing of molten steel, nitrogen desulfurization of molten iron, fluid bed reactors, and the like. In this respect, the permeable refractory materials of this invention have proven to be especially effective as permeable plugs for molten iron containing ladles. The presence of the permeable plug renders it possible to economically desulfurize the molten iron. Needless to say, numerous additional uses for the permeable products of this invention are found throughout the refractory industry.

The many facets of this invention are further illustrated by the following examples which are not to be construed as limitations thereof. On the contrary resort may be had to various other embodiments modifications and equivalents of these examples which readily suggest themselves to those skilled in the art without departing from the spirit of the present invention and/or the scope of the appended claims.

EXAMPLES 1-4

Four brick batch mixes are prepared which contain by weight between 79.80 and 79.95 percent tabular alumina and 0.05 to 0.20 percent LiF as shown in Table I. The major portion of the tabular alumina particles range in size from 8 to 20 mesh and the ratio of the diameter of the largest particles of the major portion of the diameter of the smallest particles thereof is 2.8. In addition to the tabular alumina and LiF the brick batch mix contains by weight 10 percent calcined alumina fines, the particles of which are smaller than 325 mesh, 8 percent silica sand, the majority of the particles of which are smaller than 200 mesh and 2 percent bentonite, the majority of the particles of which are smaller than 325 mesh. To these brick batch mixes there is then added 2 percent phosphoric acid (70 percent H₃PO₄) and 2 percent lignosulfonate binder based on the weight of the mix. Thereafter, each mix is tempered and air rammed into refractory shapes. The shapes are then fired for five hours at 1450° C. After cooling, the porosity, cold crushing strength and permeability are determined. These results are set forth in Table I.

TABLE I

| Example number | 1 | 2 | 3 | 4 |
|---|---|---|---|---|
| Tabular alumina, percent | 79.95 | 79.90 | 79.85 | 79.80 |
| LiF addition, percent | 0.05 | 0.10 | 0.15 | 0.20 |
| Open porosity, percent | 26.8 | 24.2 | 23.9 | 24.6 |
| Cold crushing strength, p.s.i | 3,250 | 6,460 | 7,220 | 7,610 |
| Permeability, centidarcys (25 p.s.i. back pressure) | 1,490 | 1,770 | 1,430 | 1,180 |

As shown in Table I the refractory bricks prepared in accordance with the present invention exhibit both good cold crushing strength and high degree of permeability.

EXAMPLE 5

In a manner similar to that of Examples 1 to 4, a brick batch mix is prepared which contains by weight 79.9 percent tabular alumina having particles which range in size from 28 to 65 mesh. The ratio of the diameter of the largest particles of the major portion of the tabular alumina to the diameter of the smallest particles thereof is 2.8. Along with the tabular alumina, the brick batch mix comprises 10 percent calcined alumina fines which are less than 325 mesh, 8 percent silica sand, the majority of particles which are less than 200 mesh, 2 percent bentonite and 0.1 percent lithium fluoride. Based on the weight of the mix, there is then added to the mix 2 percent phosphoric acid (75 percent H₃PO₄) and 2 percent lignosulphonate binder. Bricks are prepared from this mix by hydraulic pressing into 9" x 4½" x 2½" bricks at 3500 p.s.i and then tested so as to determine their physical characteristics.

These bricks had an open porosity of 28.6 percent, a cold crushing strength of 10,800 p.s.i. and a permeability of 1,990 centidarcys at 25 p.s.i. back pressure.

EXAMPLE 6

In a manner similar to that of Example 5, a brick batch mix is prepared containing the same constituents except that the major portion of the tabular alumina has particles which range in size from 48 to 150 mesh with a size ratio of 2.8. The bricks prepared from this mix had an open porosity of 29.3 percent, a cold crushing strength of 17,000 p.s.i. and a permeability of 880 centidarcys at 25 p.s.i. back pressure.

We claim:

1. A refractory brick batch mix consisting essentially of, by weight, about 85 to 95 percent alumina, about 3.99 to 13.99 percent silica, about 0.01 to 0.5 percent of at least one lithium compound capable of oxidizing to lithium oxide and about 1 to 5 percent bentonite, wherein at least 65 percent, by weight, of the particles of said mix are in the range of about 8 to 200 mesh and at least 10 percent, by weight, of the particles are 325 mesh or smaller and a major portion of the particles in the 8 to 200 mesh range are of a size such that the ratio of the diameter of the largest particles of said major portion to the diameter of the smallest particles thereof is in the range of 3:1 to 1:1.

2. A refractory brick batch mix according to claim 1 wherein 70 to 80 percent, by weight, of the particles of said mix are in the range of 8 to 200 mesh.

3. A refractory brick batch mix according to claim 2 wherein 15 to 30 percent, by weight, of the particles of said mix are 325 mesh or smaller.

4. A refractory brick batch mix according to claim 3 wherein said mix consists essentially of, by weight, about 88 to 92 percent alumina, about 5.95 to 9.95 percent silica, about 0.05 to 0.2 percent of at least one lithium compound capable of oxidizing to lithium oxide and about 2 to 3 percent bentonite.

5. A refractory brick batch mix according to claim 4 wherein the ratio of the diameter of the largest particles to the diameter of the smallest particles is in the range of 2.9:1 to 2:1.

6. A refractory brick batch mix according to claim 5 wherein said lithium compound is selected from the group consisting of lithium fluoride and lithium carbonate.

7. A refractory brick batch mix according to claim 6 wherein said lithium compound is lithium fluoride.

8. A refractory brick batch mix according to claim 1 wherein there is incorporated a binder selected from the group consisting of phosphoric acid and sodium lignosulfonate.

9. A refractory brick batch mix according to claim 1 wherein the alumina is tabular alumina.

10. A process for the preparation of permeable refractory bricks which comprises:
   (a) blending a refractory brick batch mix consisting essentially of, by weight, about 85 to 95 percent alumina, about 3.99 to 13.99 percent silica, about 0.01 to 0.5 percent of at least one lithium compound capable of oxidizing to lithium oxide and about 1 to 5 percent bentonite, wherein at least 65 percent, by weight, of the particles of said mix are in the range of about 8 to 200 mesh and at least 10 percent, by weight, of the particles are 325 mesh or smaller and a major portion of the particles in the 8 to 200 mesh range are of a size such that the ratio of the diameter of the largest particles of said major portion to the diameter of the smallest particles thereof is in the range of 3:1 to 1:1;
   (b) pressing the blended mixture into brick form; and
   (c) firing the formed brick at a temperature which is effective to provide a ceramic bond.

11. A process according to claim 10 wherein the mix is pressed at a pressure in the range of about 2,000 to 5,000 p.s.i. and fired at a temperature in the range of about 1,200 to 1,700° C.

12. A process according to claim 11 wherein the mix is pressed at a pressure in the range of about 2,500 to 3,500 p.s.i. and fired at a temperature in the range of about 1,350 to 1,550° C.

13. A process according to claim 10 wherein 70 to 85 percent, by weight, of the particles of said mix are in the range of 8 to 200 mesh.

14. A process according to claim 13 wherein 15 to 30 percent, by weight, of the particles of said mix are 325 mesh or smaller.

15. A process according to claim 14 wherein said mix consists essentially of, by weight, about 88 to 92 percent alumina, 5.95 to 9.95 percent silica, 0.05 to 0.2 percent of at least one lithium compound capable of oxidizing to lithium oxide and about 2 to 3 percent bentonite.

16. A process according to claim 15 wherein the ratio of the diameter of the largest particles to the diameter of the smallest particles is in the range of 2.9:1 to 2:1.

17. A process according to claim 16 wherein said lithium compound is selected from the group consisting of lithium fluoride and lithium carbonate.

18. A fired refractory shape prepared from a mix consisting essentially of, by weight, about 85 to 95 percent alumina, about 3.99 to 13.99 percent silica, about 0.01 to 0.5 percent of at least one lithium compound capable of oxidizing to lithium oxide and about 1 to 5 percent bentonite, wherein at least 65 percent, by weight, of the particles of said mix are in the range of about 8 to 200 mesh and at least 10 percent, by weight, of the particles are 325 mesh or smaller and a major portion of the particles in the 8 to 200 mesh range are of a size such that the ratio of the diameter of the largest particles of said major portion to the diameter of the smallest particles thereof is in the range of 3:1 to 1:1; said refractory shape having a permeability of at least 500 centidarcys at 25 p.s.i. back pressure.

19. A fired refractory shape according to claim 18 wherein said refractory shape has a permeability of 1,000 to 2,000 centidarcys at 25 p.s.i. back pressure.

20. A fired refractory shape according to claim 18 wherein 70 to 85 percent, by weight, of the particles of said mix are in the range of 8 to 200 mesh.

21. A fired refractory shape according to claim 20 wherein 15 to 30 percent, by weight, of the particles of said mix are 325 mesh or smaller.

22. A fired refractory shape according to claim 21 wherein said mix consists essentially of, by weight, about 88 to 92 percent alumina, 5.95 to 9.95 percent silica, 0.05 to 0.2 percent of at least one lithium compound capable of oxidizing to lithium oxide and about 2 to 3 percent bentonite.

23. A fired refractory shape according to claim 22 wherein the ratio of the diameter of the largest particles to the diameter of the smallest particles is in the range of 2.9:1 to 2:1.

24. A fired refractory shape according to claim 23 wherein said lithium compound is selected from the group consisting of lithium fluoride and lithium carbonate.

References Cited
UNITED STATES PATENTS

| | | | |
|---|---|---|---|
| 2,007,052 | 7/1935 | Howe | 106—67 |
| 2,569,430 | 9/1951 | Schroeder et al. | 106—68 |
| 3,179,526 | 4/1965 | Dolph | 106—65 |

JAMES E. POER, Primary Examiner

U.S. Cl. X.R.

106—67, 68